June 26, 1934.　　　R. A. GOEPFRICH　　　1,964,150
BRAKE

Filed July 12, 1929

INVENTOR.
RUDOLPH A. GOEPFRICH
BY
ATTORNEY

Patented June 26, 1934

1,964,150

UNITED STATES PATENT OFFICE 1,964,150

BRAKE

Rudolph A. Goepfrich, South Bend, Ind., assignor to Bendix Brake Company, South Bend, Ind., a corporation of Illinois Application July 12, 1929, Serial No. 377,659

3 Claims. (Cl. 188—78)

This invention relates to brakes and is illustrated as embodied in an internal expanding brake for an automobile. An object of the invention is to provide a simple yet positive applying device preferably for a brake of the double wrapping type arranged to balance the thrust on the brake shoes or their equivalent.

Another object of the invention is to combine a control member movable in a horizontal plane with an applying device movable in the same plane in applying the brake.

Another object of the invention is the provision of a combination control and applying mechanism for the brake wherein a forward thrust of the brake control member is translated into a lateral thrust of the brake applying device, and in one preferred embodiment of my invention, a control lever member movable in a horizontal plane and pivoted to an unsprung portion of the vehicle serves to apply a bell crank lever which is pivotally connected at its end to laterally move a toggle brake applying device.

A further object of my invention resides in the provision of control means for the brake so connected with the applying means therefor as to enable the applying means to be arranged to one side of a perpendicular plane extending through the axis of the brake. This result may be accomplished by connecting the control member with the laterally movable applying device through the intermediary of a bell crank lever.

Other objects and features of the invention, including the structure of the friction device and its cooperation with the applying means, will be apparent from the following description of the illustrative embodiments of the invention shown in the accompanying drawing, in which.

Figure 1:
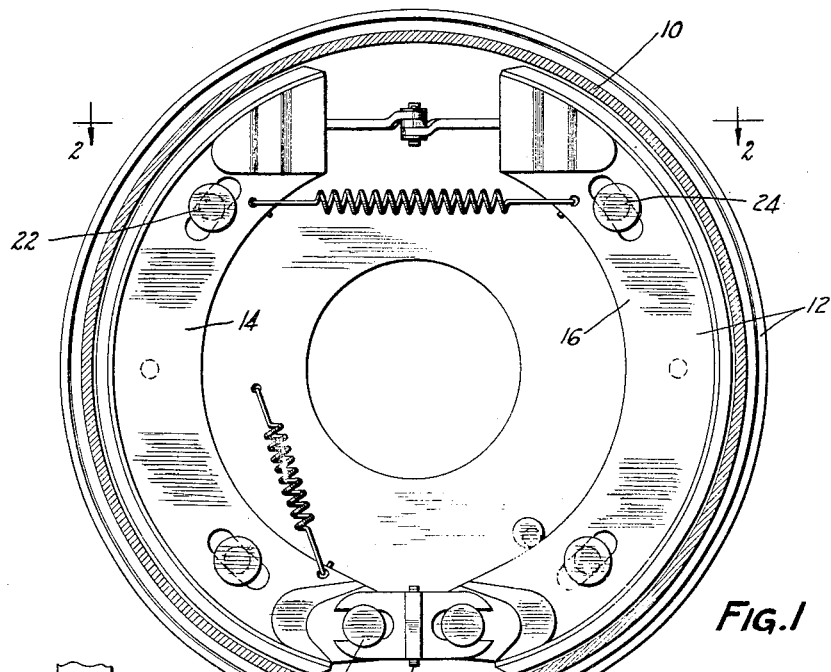
Figure 1 is a vertical section through the brake just inside the head of the brake drum showing the brake shoes in side elevation and illustrating the invention as applied.

The brake selected for illustration includes a rotatable drum 10, at the open side of which is a support such as a backing plate 12 and within which is the friction means of the brake. The friction means preferably includes a pair of interchangeable floating shoes 14 and 16 having transverse pivots 18 into which are threaded right and left threaded ends of an adjusting member 20. When the drum is turning clockwise, shoe 14 anchors on a fixed post 22 carried by the backing plate, and when the drum is turning counterclockwise, shoe 16 anchors on a similar fixed post 24, posts 22 and 24 passing through elongated slots in the webs of the shoes.

According to an important phase of the invention, the brake is applied by means included in the illustrated embodiment, wherein a bell crank lever 26 may be pivotally mounted at its hub to the backing plate 12. One arm of the lever is pivoted to one end of a tension link 28, the other end of which is pivotally connected to pivotally connected ends of compression thrust links 30. These links constitute a toggle applying means to spread apart and applying the shoes of the brake.

According to another important feature of my invention, the thrust links 30 are rounded at their ends to fit within correspondingly shaped depressions in a box-shaped stamping 32 secured to the webs of the friction means.

The applying means for the brake may be actuated by a control member which may take the form of a lever member 34 pivoted at 36 on an unsprung portion of the vehicle such as the axle 38, which lever contacts at its end with the end of the bell crank lever 26 the point of contact lying in or immediately adjacent the swivelling axis 39 of the wheel when the brake is applied.

Figures 2, 3:
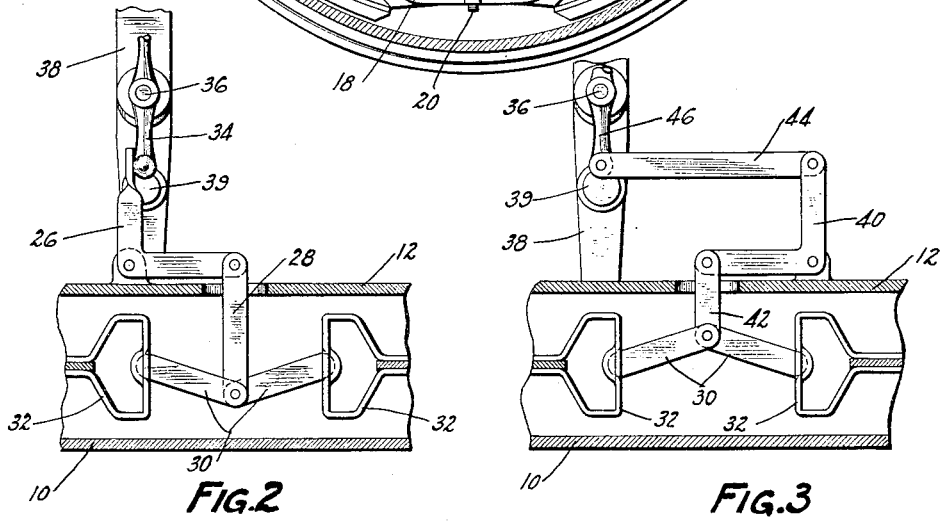
Figure 2 is a sectional view substantially on the line 2—2 of Figure 1 partly broken away and showing a top plan view of the control and applying means of the brake.
Figure 3 is a view similar to Figure 2 showing a modified form of brake actuating mechanism.

In the modified form of my invention disclosed in Figure 3, the bell crank 40 may be rocked to apply compression through link 42 to the knee of the toggle. This spreads the toggle and forces the separable ends of the friction device. The bell crank 40 is actuated through the intermediary of a tension link 44 having one of its ends pivoted to one arm of the bell crank and its other end pivoted to a control lever 46.

With both embodiments of my invention the forward motion of the control lever, which motion is in a horizontal plane, is translated into lateral motion of the brake applying device in the same plane. This construction has its advantages, in that the toggle applying means of the brake may be arranged to one side of a perpendicular plane extending through the axis of the brake. With the construction disclosed in Figure 3, this result is accomplished through the intermediary of a connecting tension link 44. The link 42 acts in compression as distinguished from the tension link 28. With both embodiments, forward motion on thrust of the control lever is translated into lateral motion of the applying device. By virtue of the floating arrangement of the links of the applying toggle, the selective anchoring of the friction means of the brake on anchor posts 22 and 24 is made possible.

While several illustrative embodiments have been described in detail, it is not my intention to limit the scope of the invention to those particular embodiments, or otherwise than by the terms of the appended claims.

I claim:

1. A brake comprising, in combination, friction means and an applying device therefor including a toggle movable crosswise of the brake, a bell crank lever pivotally attached to the toggle and a control lever movable in a horizontal plane disconnectedly engaging one end of the bell crank lever.

2. A brake comprising, in combination, a fixed support, friction means on the fixed support having separable ends adapted to anchor at one of said ends when the drum is turning in one direction and at the other end when the drum is turning in the other direction, laterally movable applying means including a toggle lying in a horizontal plane and directly connected to said ends for actuating said friction means, and a lever on the fixed support for actuating said applying means movable in a horizontal plane.

3. A brake comprising a rotatable drum, friction means within said drum having separable ends, a hollow box shaped stamping fixed on either end, a socket in each of said stampings, and toggle means for actuating said friction means setting in said sockets.

RUDOLPH A. GOEPFRICH.